US008847942B2

(12) United States Patent
Jankovic et al.

(10) Patent No.: US 8,847,942 B2
(45) Date of Patent: Sep. 30, 2014

(54) METHOD AND CIRCUIT FOR COMPENSATING PIXEL DRIFT IN ACTIVE MATRIX DISPLAYS

(75) Inventors: Nebojsa D. Jankovic, Nis (RS); Vladimir M. Brajovic, Pittsburgh, PA (US)

(73) Assignee: Intrigue Technologies, Inc., Pittsburgh, PA (US)

( * ) Notice: Subject to any disclaimer, the term of this patent is extended or adjusted under 35 U.S.C. 154(b) by 164 days.

(21) Appl. No.: 13/432,687

(22) Filed: Mar. 28, 2012

(65) Prior Publication Data

US 2012/0249510 A1 Oct. 4, 2012

Related U.S. Application Data

(60) Provisional application No. 61/468,874, filed on Mar. 29, 2011.

(51) Int. Cl.
*G06F 3/038* (2013.01)
*G09G 5/00* (2006.01)
*G09G 3/14* (2006.01)
*G09G 3/32* (2006.01)

(52) U.S. Cl.
CPC ........ *G09G 3/3233* (2013.01); *G09G 2320/045* (2013.01); *G09G 2300/0819* (2013.01); *G09G 3/3291* (2013.01); *G09G 2300/0842* (2013.01)
USPC .............................. 345/211; 345/214; 345/39

(58) Field of Classification Search
CPC .................... G09G 2330/021; G09G 2330/02; G09G 3/3696; G09G 3/3648; G09G 3/3688; G09G 2320/043; G09G 3/20; G09G 3/3233; G09G 9/33; G01R 13/405; G01R 13/406; G01R 13/02
USPC .............................. 345/211, 214, 39, 83, 183
See application file for complete search history.

(56) References Cited

U.S. PATENT DOCUMENTS

| | | | | |
|---|---|---|---|---|
| 6,433,488 | B1 | 8/2002 | Bu | |
| 7,414,600 | B2 | 8/2008 | Nathan et al. | |
| 7,532,187 | B2 | 5/2009 | Afentakis et al. | |
| 7,868,857 | B2 | 1/2011 | Nathan et al. | |
| 2003/0189535 | A1* | 10/2003 | Matsumoto et al. ............ | 345/76 |
| 2006/0066512 | A1* | 3/2006 | Afentakis et al. ............... | 345/55 |
| 2007/0139314 | A1* | 6/2007 | Park ................................ | 345/76 |

* cited by examiner

*Primary Examiner* — Aneeta Yodichkas
(74) *Attorney, Agent, or Firm* — Robert P. Lenart, Esq.; Alan G. Towner, Esq.; Pietragallo Gordon Alfano Bosick & Raspanti, LLP

(57) ABSTRACT

An apparatus includes a circuit branch electrically connected to a voltage rail and including a light emitting device connected in series with a drain of a dual gate transistor, a switching transistor configured to apply a data voltage to a first gate of the dual gate transistor in response to a scan signal, a capacitor connected between the first gate of the dual gate transistor and the drain of the dual gate transistor, and a conductor for supplying a control voltage to a second gate of the dual gate transistor. A method of operating the circuit is also described.

20 Claims, 7 Drawing Sheets

METHOD AND CIRCUIT FOR COMPENSATING PIXEL DRIFT IN ACTIVE MATRIX DISPLAYS

CROSS-REFERENCE TO A RELATED APPLICATION

This application claims the benefit of U.S. Provisional Patent Application No. 61/468,874, filed Mar. 29, 2011, which is hereby incorporated by reference.

FIELD OF THE INVENTION

The present invention relates to a method and circuit for compensating for circuit characteristic drift in active matrix displays. More specifically, the present invention relates to a method and a circuit for automatically stabilizing a light emitting device driving current in presence of characteristic drifts of various components in a pixel circuit.

BACKGROUND OF THE INVENTION

An organic light emitting display device using organic light emitting diodes (OLEDs) is provided with OLEDs and transistors (generally thin-film-transistors, TFT) for driving the OLEDs. Depending on the material used for the TFT's active layer, the TFT devices can be classified as a poly silicon TFT, an amorphous silicon TFT, or others. Depending on the geometrical structure of the TFT device, the TFT devices can be classified into a single gate (SG) and a double-gate (DG) structure, depending on the existence/nonexistence of a second gate of TFT. The DG TFT shown in FIG. 1 has advantages that its current responds more to the variation in gate voltage compared to the same gate biasing voltage of a SG TFT.

U.S. Pat. No. 7,414,600 discloses a circuit diagram of a unit pixel of a conventional active matrix OLED which employs an n-type DG TFT with the bottom gate grounded. The voltage programming type active matrix OLED includes two DG TFTs and one capacitor. A first bottom-grounded DG TFT serves as a switch. This switch, together with a capacitor, form a track-and-hold circuit for storing and maintaining the programmed pixel voltage. A second bottom-grounded DG TFT acts as a transconductance amplifier buffer which generates the output drain current for driving the OLED without loading the capacitor at its input gate. The second TFT is often referred to as "buffer" or "driver". This type of circuit is sometime referred to as "voltage programming type" because input data are supplied in form of a voltage (Vdata). The current driving the OLED is then "derived" based on this input voltage (Vdata).

U.S. Pat. No. 7,532,187 discloses a similar example except that p-type TFT devices are deployed. Other than that the configuration and functional behavior of the circuit is similar to the circuit in U.S. Pat. No. 7,414,600.

SG TFT devices can be used in circuits shown in U.S. Pat. Nos. 7,532,187 and 7,414,600, and are also commonly deployed in active matrix displays.

The main drawback of TFT and similar devices is that their characteristics drift over time due to the continuous flow of current through them. There are multiple mechanisms responsible for this degradation including trapping of charge in broken bonds in the active material of the transistor. What complicates matters is that the degradation is not permanent and not equal over time or across different devices. The degradation primarily depends on the history of currents flowing through a particular TFT. Therefore, one method to correct for the degradation is to continuously "measure" and sample the amount of degradation and then corrected for by adjusting the input data.

It is clear that if the characteristics of the driving TFTs are not stable, the output current that drives OLED will not be stable. That is, the same input voltage will result in different OLED current, and therefore in different OLED brightness resulting in objectionable non-uniformity across the display. Sometimes, if a static image is driven and displayed for an extended period of time, followed by a second image, the imprint of the first image will be visible during the display of the second image, since the TFT devices drifted according to the intensity distribution of the first image. This is sometimes referred to as a "burn-in" effect; the first image is burned into the display. The pixel structures of U.S. Pat. Nos. 7,532,187 and 7,414,600 cannot correct the deterioration of the TFT driver threshold voltage and would demonstrate the degradation of the display.

Generally, the TFT degradation can be thought of as change or drift in the threshold voltage of the TFT. Several techniques have been proposed to address the drift and non-uniformity issues of TFT circuits (for example, Nathan, et al. U.S. Pat. No. 7,868,857). Unfortunately, many of these methods require additional TFT devices in the TFT circuits or require additional control lines to be supplied to pixels from the periphery of the circuit. Additional TFT devices make pixel electronics large, either reducing the fill factor of the pixel, or making the pixel large in size thus limiting the resolution of the display. Furthermore, many of these techniques require a modified technique for supplying Vdata, which makes the method very cumbersome and expensive to implement since it represents a significant departure from the current state-of-the-art in how the displays are driven.

An additional source of display degradation is aging of the OLEDs and drift in the OLED's characteristics. The degradation of the OLEDs could be referred to the input gate of the driving TFT and added to the degradation of the TFT threshold voltage. If one could somehow detect this combined degradation of the TFT and OLED one could adjust the input data voltage ($V_{DATA}$) to compensate for the degradation at each pixel. Bu et al. U.S. Pat. No. 6,433,488 shows a technique that senses a current through an OLED, then programs the Vdata to achieve a target OLED current. Again, this technique is cumbersome, requires additional TFT devices in the pixel, and requires significant resources outside of the pixel array.

It would be desirable to have a method and a circuit that can compensate for drift in driving TFT characteristics, the drift in OLED characteristics, or both.

SUMMARY OF THE INVENTION

In one aspect, the invention provides an apparatus including a circuit branch electrically connected to a voltage rail and including a light emitting device connected in series with a drain of a dual gate transistor, a switching transistor configured to apply a data voltage to a first gate of the dual gate transistor in response to a scan signal, a capacitor connected between the first gate of the dual gate transistor and the drain of the dual gate transistor, and a conductor for supplying a control voltage to a second gate of the dual gate transistor.

In another aspect, the invention provides an apparatus including a circuit branch electrically connected to a voltage rail and including a light emitting device connected in series with a parallel connection of first and second transistors, a switching transistor configured to apply a data voltage to a gate of the first transistor in response to a scan signal, a capacitor connected between the gate of the first transistor and the drain of the first transistor, and a conductor for supplying a control voltage to a gate of the second transistor.

In another aspect, the invention provides a method including providing a circuit comprising: a first transistor receiving a scan signal a gate, and receiving a data voltage through a source-drain current path, a light emitting device having first and second terminals, the first terminal of the light emitting device connected to a first voltage rail of a power supply, a second transistor featuring a first gate controlling a first transistor channel, a second gate controlling a second transistor channel, a source, and a drain, the first and second transistor channels connected between the source and the drain, the second transistor having the source connected to a second voltage rail of said power supply, the drain connected to the second terminal of the light emitting device, the first gate connected to the source-drain path of the first transistor, the second gate connected to a second external scan signal, and a capacitor connected between the first gate and the drain of the second transistor; turning on the first transistor by energizing the first external scan signal, thereby supplying the data voltage to the first gate of the second transistor; raising current through the second transistor channel by energizing the second gate of the second transistor with the second external scan signal; allowing a voltage on the capacitor to settle; turning off the first transistor by de-energizing the first external scan signal thereby disconnecting the data voltage from the first gate of the second transistor and allowing the first gate of the second transistor to float; turning off the current through the second channel by de-energizing the second gate of the second transistor via the second external scan signal; and energizing the light emitting device with the drain current of the second transistor.

BRIEF DESCRIPTION OF THE DRAWINGS

A complete understanding of the present invention may be obtained by reference to the accompanying drawings, when considered in conjunction with the subsequent, detailed description.

DETAILED DESCRIPTION OF THE INVENTION

Figure 1:
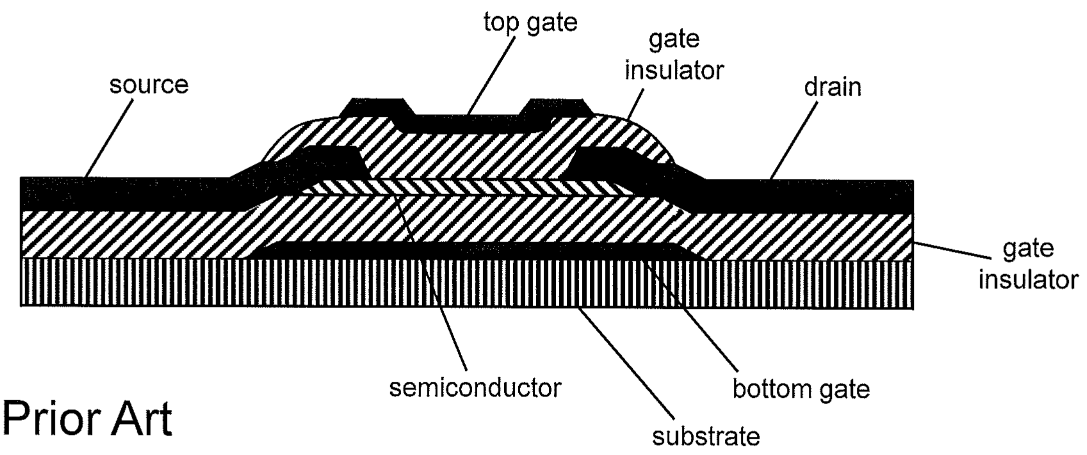
Prior Art FIG. 1
FIG. 1 is a partial cross-sectional view of an exemplary DG TFT.

Advantages and novel features of the invention will become more apparent from the following detailed description when taken in conjunction with the accompanying drawings.

Referring to the drawings in greater detail wherein like reference numerals refer to similar or identical parts throughout the various views, several embodiments of the present invention and methods of practicing the present invention will be considered.

In one aspect, the invention provides a method for compensating for component characteristic drift in pixel circuit for driving light emitting devices. A two transistor one capacitor (2T1C) active matrix display pixel circuit is described wherein the second transistor features dual gate and the capacitor is connected between the first gate and the drain of the second transistor. Alternatively the second dual-gate transistor can be implemented as two single-gate transistors. A light emitting diode is driven with the drain current of the second transistor. The second gate of the second transistor is energized during the programming period of the pixel to pre-charge the pixel capacitance. During the holding phase of the pixel, the second gate of the second transistor is de-energized, allowing the capacitor in the feedback loop to favorably control the voltage on the first gate thus stabilizing the drain current of the second transistor in view of variations that the second transistor or light emitting device can manifest over time.

Figure 4:
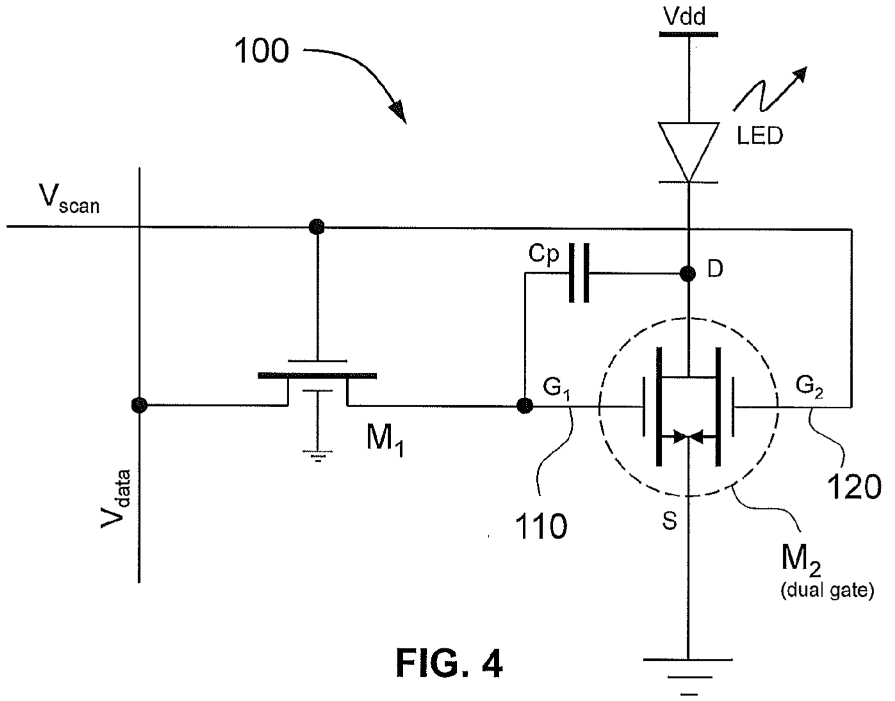
FIG. 4 is a schematic representation of one embodiment of the present invention.

One embodiment of the present invention is shown in FIG. 4 representing a pixel circuit 100 in an active matrix display. The circuit includes a first SG or DG transistor (M1), a second DG transistor M2, a capacitor Cp, and a light emitting device LED. The light emitting device could be a light emitting diode, an organic light emitting diode, a quantum-dot light emitting device, or any other current stimulated light emitting device. M1 receives signals $V_{SCAN}$ on its gate. The first source-drain terminal of M1 receives $V_{DATA}$. The second source-drain terminal of M1 is connected to the first gate G1 of M2 (110). The second gate G2 of M2 (120) is connected to the $V_{SCAN}$ signal. The source S of M2 is held at a common voltage, while the drain D is connected to the cathode of the LED. The LED anode is connected to the supply voltage VDD. The capacitor Cp is connected between the first gate G1 and drain D or M2.

In the circuit of FIG. 4, M1 acts as a switch. The gate of M1 receives the $V_{SCAN}$ signal to control the on or off state of M1. A high $V_{SCAN}$ signal would turn M1 on, and a low $V_{SCAN}$ signal would turn it off (for the circuit in FIG. 4). When M1 is turned on, $V_{DATA}$ is passed from the first source-drain terminal of M1 to the second source-drain terminal of M1, thus applying $V_{DATA}$ to G1 of M2. The second gate G2 of M2 is driven by $V_{SCAN}$ signal or other appropriate switching voltage level switched simultaneously with the $V_{SCAN}$ signal.

Figure 5:
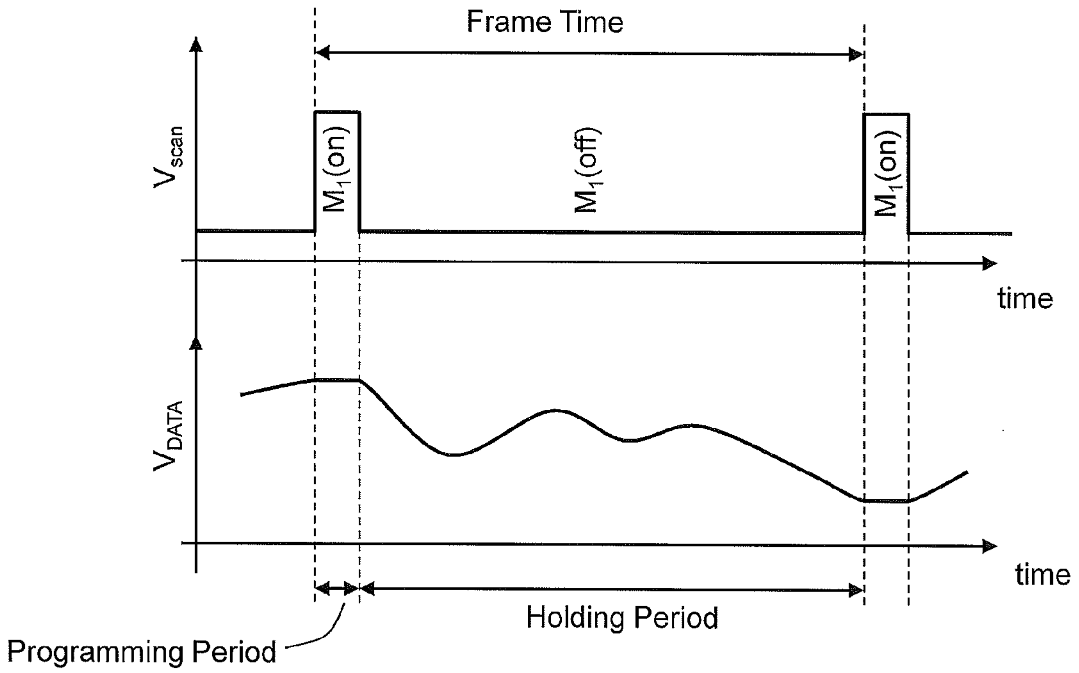
FIG. 5 is an illustration of voltage waveforms applied to the circuit in FIG. 4

The $V_{SCAN}$ and $V_{DATA}$ signal waveforms are shown in FIG. 5. The $V_{SCAN}$ and $V_{DATA}$ signal waveforms are similar to what is commonly used in active matrix displays and is common knowledge for those of ordinary skill in the art. We explain it here for completeness. $V_{SCAN}$ periodically pulses, thus addressing a particular row of pixels by connecting the row pixels to a column bus for a short period of time. This is done through the switching action of M1. $V_{DATA}$ remains substantially stable during the time M1 is switched on to allow settling and voltage programming of the first gate G1 of M2.

Once $V_{SCAN}$ is removed, the pixel substantially maintains the programmed voltage within its capacitor Cp, until the next frame is refreshed.

Figure 6:
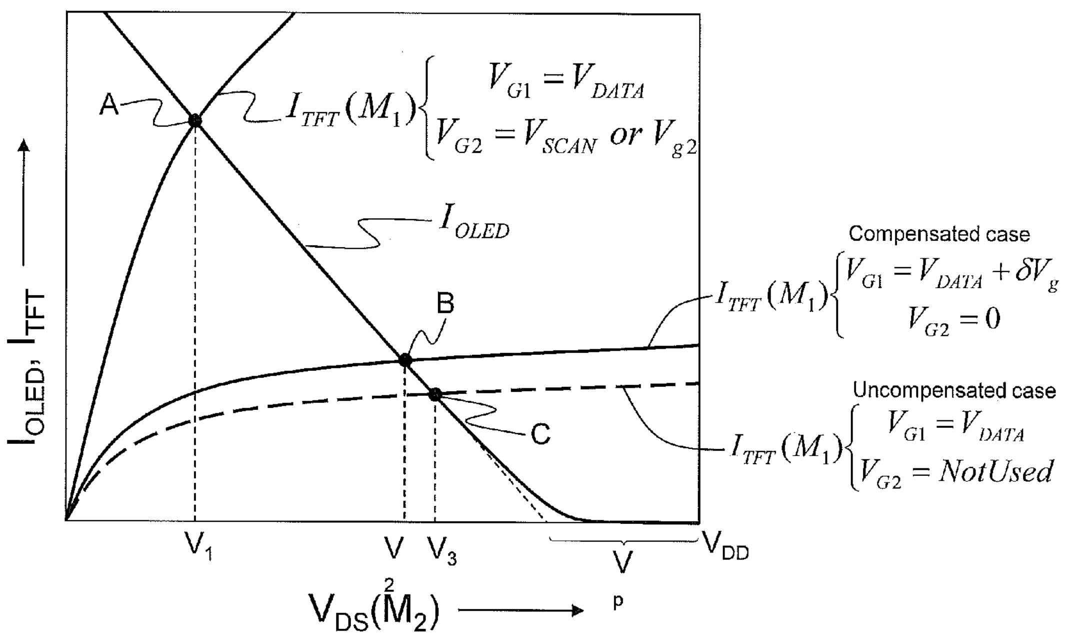
FIG. 6 is a graph showing the key operating points of the circuit in FIG. 4.

FIG. 6 shows key operating points for the circuit 100 in FIG. 4 as $V_{SCAN}$ is sequenced. Referring jointly to FIG. 4 and FIG. 6 the operation of the circuit is as follows. During the short $V_{SCAN}$ pulse, the gates G1 and G2 of M2 are biased with $V_{G1}=V_{DATA}$ and $V_{G2}=V_{SCAN}$, respectively. For this case, the dual-gate transistor M2 operating point is in point A with $V_{DS}(M2)=V_1$ as shown in FIG. 6. The strong current contribution from the G2 channel of M2 pushes V1 to be substantially low. During this time, the capacitor is programmed to $(V_{DATA}-V_1)$ voltage. After the programming, $V_{SCAN}$ goes low. Then, the circuit automatically establishes a new, smaller value of LED current since the current from the channel of the second gate G2 is excluded. Without a capacitance Cp placed in the feedback between drain D and the first gate G1 of M2, the M2 operating point would be at point C with $V_{DS}(M2)=V_3$ as shown in FIG. 6. Instead, due to the feedback capacitance Cp, the voltage transient at the drain of M2 is transferred back to G1 increasing the voltage at the first gate G1 by the amount of δVg. Because of this negative feedback loop the steady state operating point when $V_{SCAN}$ is turned off leads to a final operating point at point B with $V_{DS}(M2)=V_2$ and $V_{G1}=V_{DATA}+\delta Vg$ as shown in FIG. 6. δVg can be expressed as:

$$\delta V_g = \frac{C_p + C_{gd}(M2)}{C_p + C_{gd}(M2) + C_{gs}(M2) + C_{gs}(M1)} \times (V_2 - V_1) = m \times (V_2 - V_1), \quad (1)$$

where $C_{gd}(M2)$, $C_{gs}(M2)$ and $C_{gs}(M1)$ are corresponding gate-drain, and gate-source overlapping capacitances of M1 and M2, respectively, and m is a parameter approaching unity for sufficiently large Cp.

During the holding period with $V_{SCAN}$ low, the LED current is determined by the voltage of G1 as:

$$I_d(M2)|_{G1}=I_{OLED}, \quad (2)$$

with M2 operating in saturation. The drain current of M2 in saturation is given by $$I_d(M^2)\approx\beta\times(V_{DATA}-V_{th}+\delta V_g)^{\alpha}, \quad (3)$$

where β is the gain coefficient, $V_{th}$ is the M2 threshold voltage and α is the power low parameter. It is clear that the additional term δVg in (3) will compensate any $V_{th}$ drift if $\partial V_{th}/\partial(\delta V_g)=1$. Using a linear approximation for the LED curve in the range of $V_{DD}-V_{DS}\geq V_p$, the LED current is expressed as:

$$I_{OLED}\approx(V_{DD}-V_{DS}-V_p)/R_d, \text{ for } V_{DD}-V_{DS}\geq V_p \quad (4)$$

where $V_p$ is the LED threshold voltage shown in FIG. 6. In this region and for the purpose of this analysis, the LED dynamic resistance $R_d=\partial V_{OLED}/\partial I_{OLED}$ can be considered constant due to the inherently large series resistance of LED. By combining equations (1), (2), (3) and (4), and with $\alpha\approx2$, $V_1\approx$const, $R_d\approx$const and $V_{DS}\approx V_2$, it can be shown that:

$$\frac{\partial V_{th}}{\partial(\delta V_g)} = 1 - [2\times m\times\beta\times R_d\times(V_{DATA} - V_{th} + \delta V_g)]^{-1}. \quad (5)$$

For in $m\cdot\beta\cdot R_d>>1$, equation (5) reduces to $\partial V_{th}/\partial(\delta V_g)\approx1$, meaning that the LED current becomes immune to the $V_{th}$ drift and deterioration.

Figure 7:
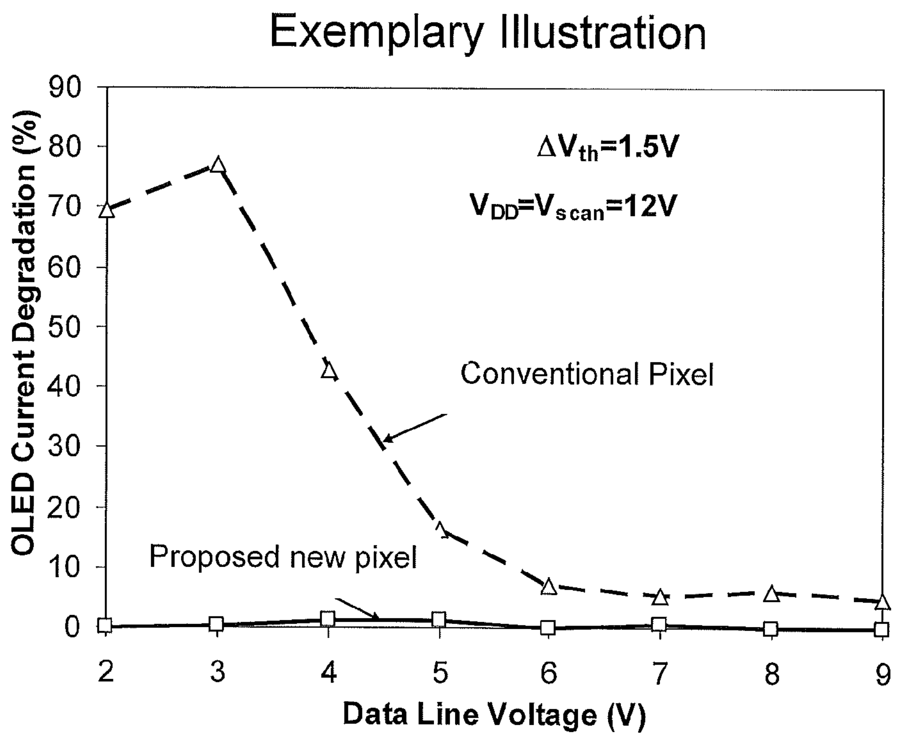
FIG. 7 is a graph that illustrates the efficacy in decreasing the OLED current degradation at different programming voltages when the equivalent drift in threshold voltage is 1.5V.
Figure 8:
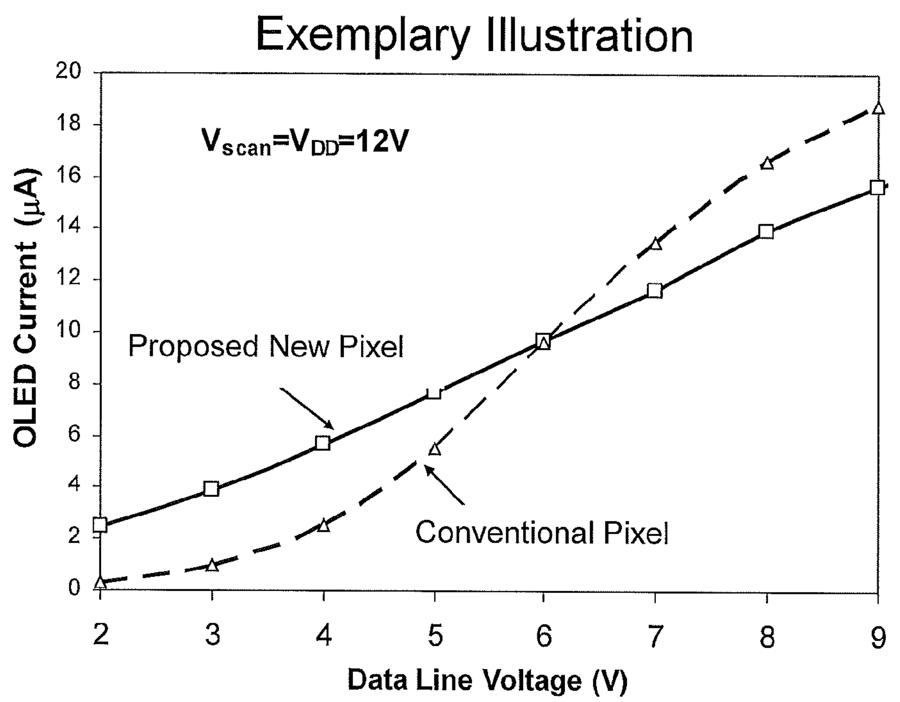
FIG. 8 is a graph comparing the I-V characteristics of an embodiment of the present invention and a conventional two transistor one capacitor (2T1C) dual-gate transistor pixel circuit.

The above analytical conclusions can be more precisely demonstrated through circuit simulation. One example is shown in FIG. 7. The graph in FIG. 7 shows relative LED current degradation due to a 1.5V $V_{th}$ shift of M2 for different programming voltages $V_{DATA}$. While the relative degradation in the conventional pixel is more than 75%, the present invention delivers degradation of less than 1.5%. In addition, FIG. 8 shows a comparison between the I-V characteristics of the pixel circuit of FIG. 4 and the conventional pixel of prior art. An advantageous linear I-V characteristic of new pixel circuit is clearly observed in FIG. 7 owning to a beneficial influence of the δVg term in equation (3), whereas a conventional pixel circuit exhibits substantial nonlinearity of its programming characteristics. The relative LED current degradation plotted in FIG. 7 is found as:

$$\text{Driving/Drain Current Degradation} = \frac{I_{LED}(V_{th0}) - I_{LED}(V_{th0} + \Delta V_{th})}{I_{LED}(V_{th0})} \cdot 100\% \quad (6)$$

Figure 9:
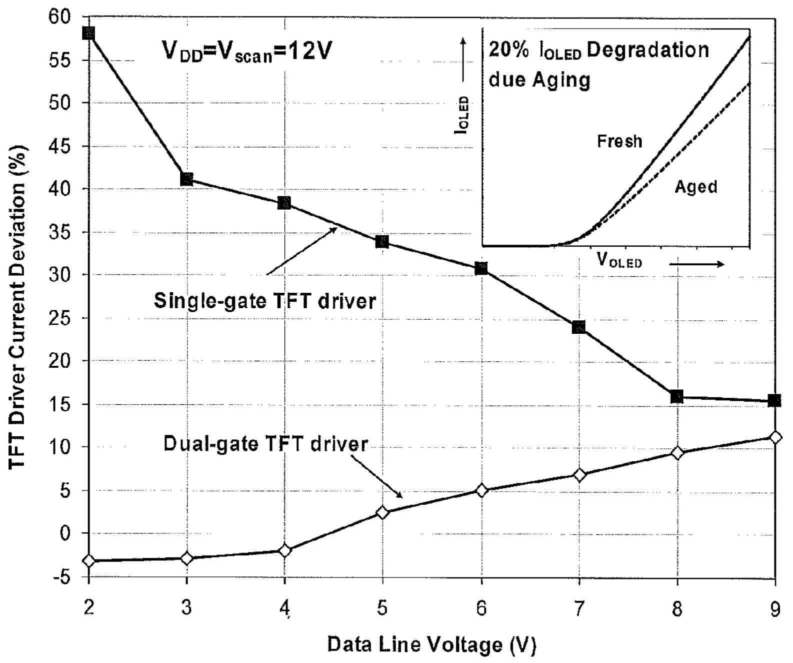
FIG. 9 is a graph that illustrates the efficacy of an embodiment of the invention in decreasing the LED current degradation at different programming voltages when the LED's light output is reduced by 20% due to aging, for example.

FIG. 9 shows additional benefits of the present invention in that it reduces the display degradation due to LED's non-uniformity and aging. If the LED's I-V curve changes due to aging or to pixel-to-pixel nonuniformity, the voltage difference $(V_2-V_1)$ will change too, which in turn reflects in a favorable change in $\delta V_g$ that will correct the voltage at the first gate $G_1$ of $M_2$ thus compensating for the degradation in LED. FIG. 9 shows an example simulation that shows great improvement afforded by present invention compared to the conventional case. The driver current deviation plotted in FIG. 9 is calculated as:

$$\text{Driving/Drain Current Deviation} = \frac{I_{TFT}(\text{fresh } LED) - I_{TFT}(\text{aged } LED)}{I_{TFT}(\text{fresh } LED)} \cdot 100\% \quad (7)$$

Figure 2:
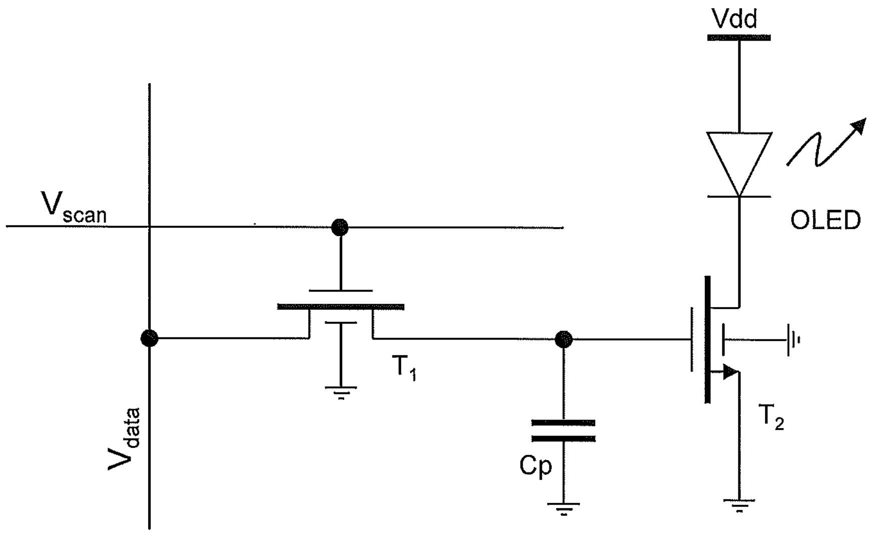
PRIOR ART FIG. 2
FIG. 2 is a schematic diagram of a prior art pixel circuit using a DG TFT.
Figure 3:
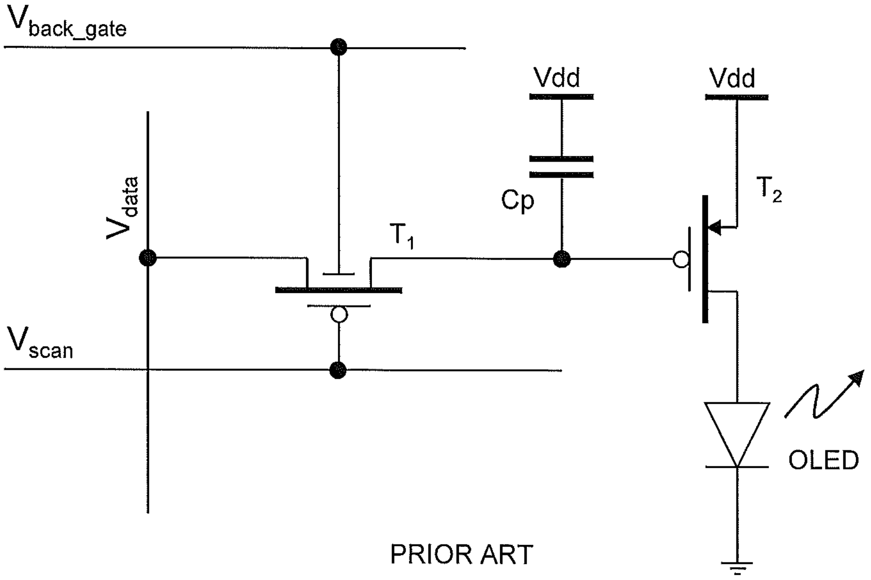
PRIOR ART FIG. 3
FIG. 3 is a schematic diagram of another exemplary prior art DG TFT pixel circuit.

The pixel circuit 100 shown in FIG. 4 thus overcomes the drawbacks existing in the conventional active matrix pixel driving circuits while reducing the transistor drift, LED drift, and improving non-linearity. At the same time the basic circuit of FIG. 4 does not require any changes to the externally driven signals ($V_{DATA}$ and $V_{SCAN}$ lines) compared to the conventional state-of-the-art. Furthermore, no extra space for circuitry is required compared to the conventional 2T1C pixel circuits (FIG. 1 and FIG. 2). With its simple conventional voltage driving scheme and with no additional control lines, the proposed pixel maximizes an overall fill factor of display pixels.

Figure 10:
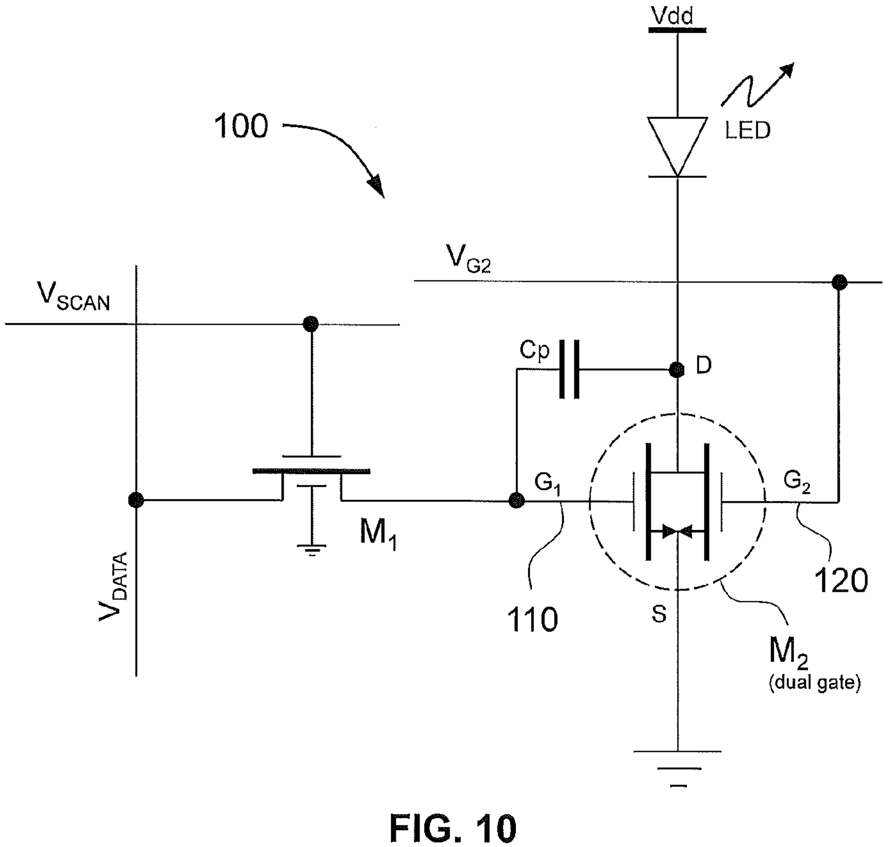
FIG. 10 shows another embodiment of the present invention.

Additional control of the circuit compensation behavior could be obtained by controlling the height of the pulse on the second-gate. In most instances, the height of the $V_{SCAN}$ pulse can be slightly adjusted without adversely affecting the switching properties of $M_1$. However, $G_2$ of $M_2$ can be driven from a line that is separate from $V_{SCAN}$ and supplies the $V_{G2}$ signal (see FIG. 10). In this case more flexibility is afforded as to the voltage levels and shape of $V_{G2}$.

Figure 11:
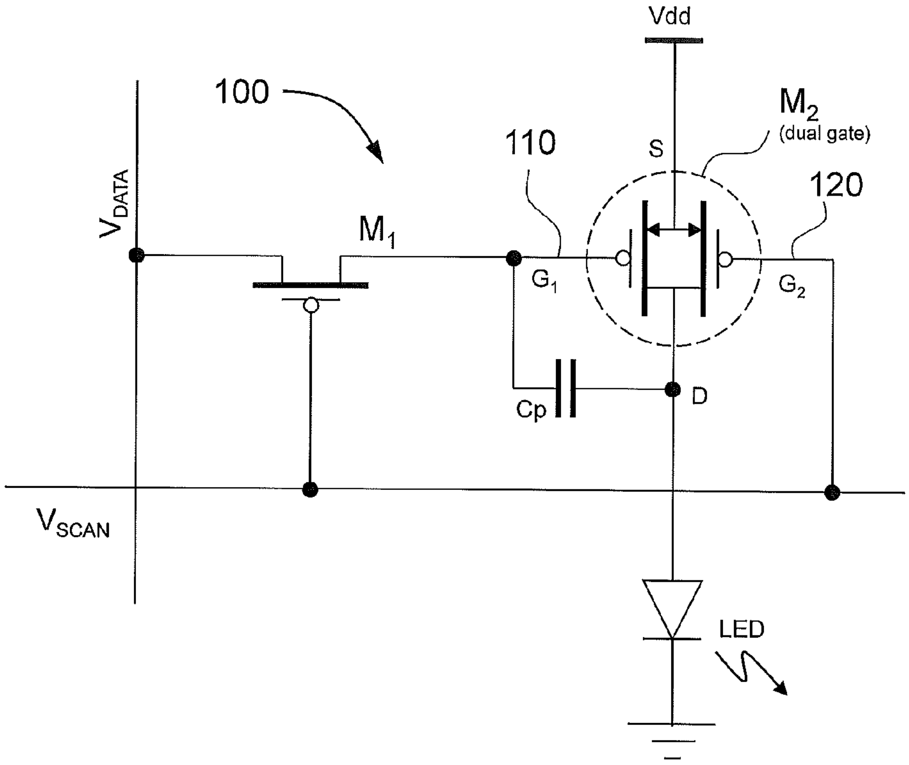
FIG. 11 shows another embodiment of the present invention.
Figure 12:
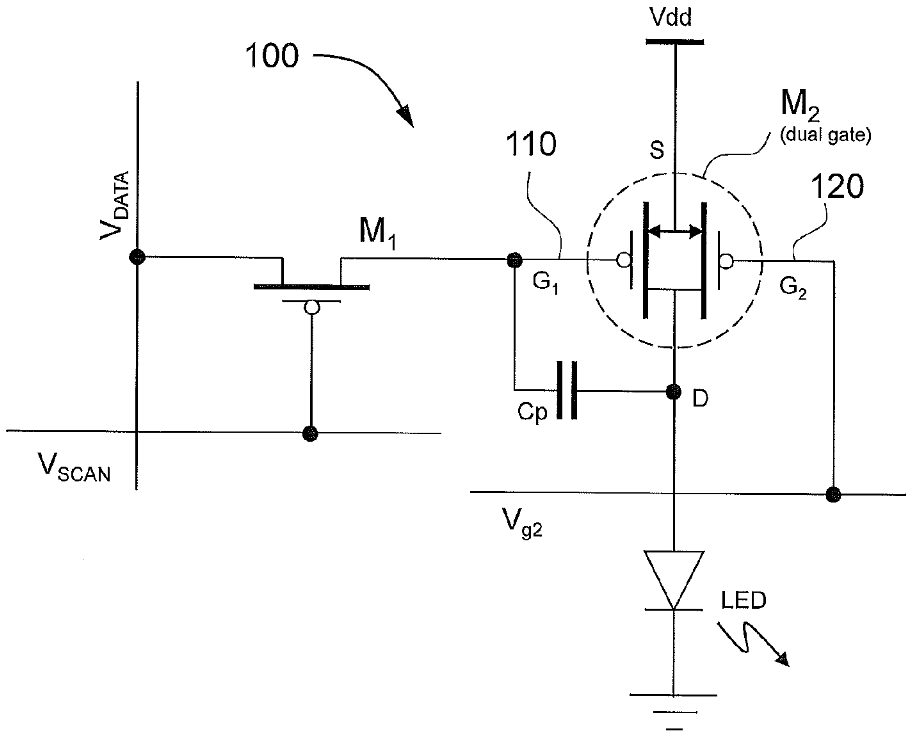
FIG. 12 shows another embodiment of the present invention.

It is advantageous to implement M2 as DG transistor. However, M2 can be replaced by two SG transistors whose sources and drains are wired in parallel. Such variation would still be within the scope of the present invention. Additionally, p-type transistor circuit variations of circuit 100 (FIG. 11 and FIG. 12) would also fall within the scope of the present invention.

As can be seen from the above description, in one aspect the invention provides a method for compensating for component characteristic drift in pixel circuit for driving light emitting devices comprising steps of: providing a 2T1C active matrix display pixel circuit wherein the second transistor features dual gate and the capacitor is connected between the first gate and the drain of the second transistor. A light emitting diode is driven with the drain current of the second transistor. The second gate of the second transistor is energized during the programming period of the pixel to pre-charge pixel capacitance. During the holding phase of the pixel, the second gate of the second transistor is de-energized, allowing the capacitor in the feedback loop to favorably control the voltage on the first gate thus stabilizing the drain current of the second transistor in view of variations that the second transistor or light emitting device can manifest over time. An alternative implementation of the second dual-gate transistor could be accomplished by two single-gate transistors whose source and drain are wired together.

While the invention has been described in terms of several embodiments, it will be apparent to those skilled in the art that various changes can be made to the described embodiments without departing from the invention as set forth in the following claims.

What is claimed is:

1. An apparatus comprising:

a circuit branch electrically connected to a voltage rail and including a light emitting device connected in series with a drain of a dual gate transistor;

a switching transistor configured to apply a data voltage to a first gate of the dual gate transistor in response to a scan signal;

a capacitor connected between the first gate of the dual gate transistor and the drain of the dual gate transistor; and a conductor for supplying a control voltage to a second gate of the dual gate transistor.

2. The apparatus of claim 1, wherein the control voltage is the scan signal.

3. The apparatus of claim 1, wherein the dual gate transistor comprises a thin film transistor.

4. The apparatus of claim 1, wherein the light emitting device is a light emitting diode.

5. The apparatus of claim 1, wherein the switching transistor and the dual gate transistor include n-type channels.

6. The apparatus of claim 1, wherein the switching transistor and the dual gate transistor include p-type channels.

7. An apparatus comprising:

a circuit branch electrically connected to a voltage rail and including a light emitting device connected in series with a parallel connection of first and second transistors;

a switching transistor configured to apply a data voltage to a gate of the first transistor in response to a scan signal;

a capacitor connected between the gate of the first transistor and the drain of the first transistor; and a conductor for supplying a control voltage to a gate of the second transistor.

8. The apparatus of claim 7, wherein the control voltage is the scan signal.

9. The apparatus of claim 7, wherein the first, second, and switching transistors each comprises a thin film transistor.

10. A method for compensating for component characteristic drift in a pixel circuit for driving light emitting devices comprising steps of:

providing a circuit comprising:

a first transistor receiving a scan signal a gate, and receiving a data voltage through a source-drain current path, a light emitting device having first and second terminals, the first terminal of the light emitting device connected to a first voltage rail of a power supply, a second transistor featuring a first gate controlling a first transistor channel, a second gate controlling a second transistor channel, a source, and a drain, the first and second transistor channels connected between the source and the drain, the second transistor having the source connected to a second voltage rail of said power supply, the drain connected to the second terminal of the light emitting device, the first gate connected to the source-drain path of the first transistor, the second gate connected to a second external scan signal, and a capacitor connected between the first gate and the drain of the second transistor;

turning on the first transistor by energizing the first external scan signal, thereby supplying the data voltage to the first gate of the second transistor;

raising current through the second transistor channel by energizing the second gate of the second transistor with the second external scan signal;

allowing a voltage on the capacitor to settle;

turning off the first transistor by de-energizing the first external scan signal thereby disconnecting the data voltage from the first gate of the second transistor and allowing the first gate of the second transistor to float;

turning off the current through the second channel by de-energizing the second gate of the second transistor via the second external scan signal; and energizing the light emitting device with the drain current of the second transistor.

11. The method of claim 10, wherein the step of turning on the first transistor and the step of raising the current through the second transistor channel are performed simultaneously.

12. The method of claim 10, wherein the step of turning off the first transistor and turning off the current through the second channel are performed simultaneously.

13. The method of claim 10, wherein the first external scan signal and the second external scan signal are wired together representing a single scan signal.

14. The method of claim 10, wherein the second transistor comprises a dual gate transistor.

15. The method of claim 10, wherein the second transistor comprises a dual gate thin film transistor.

16. The method of claim 10, wherein the second transistor comprises two transistors.

17. The method of claim 10, wherein the second transistor comprises two thin film transistors.

18. The method of claim 10, wherein the light emitting device comprises a light emitting diode.

19. The method of claim 10, wherein the first and second transistors include n-type channels.

20. The method of claim 10, wherein the first and second transistors include p-type channels.

* * * * *